Patented May 29, 1934

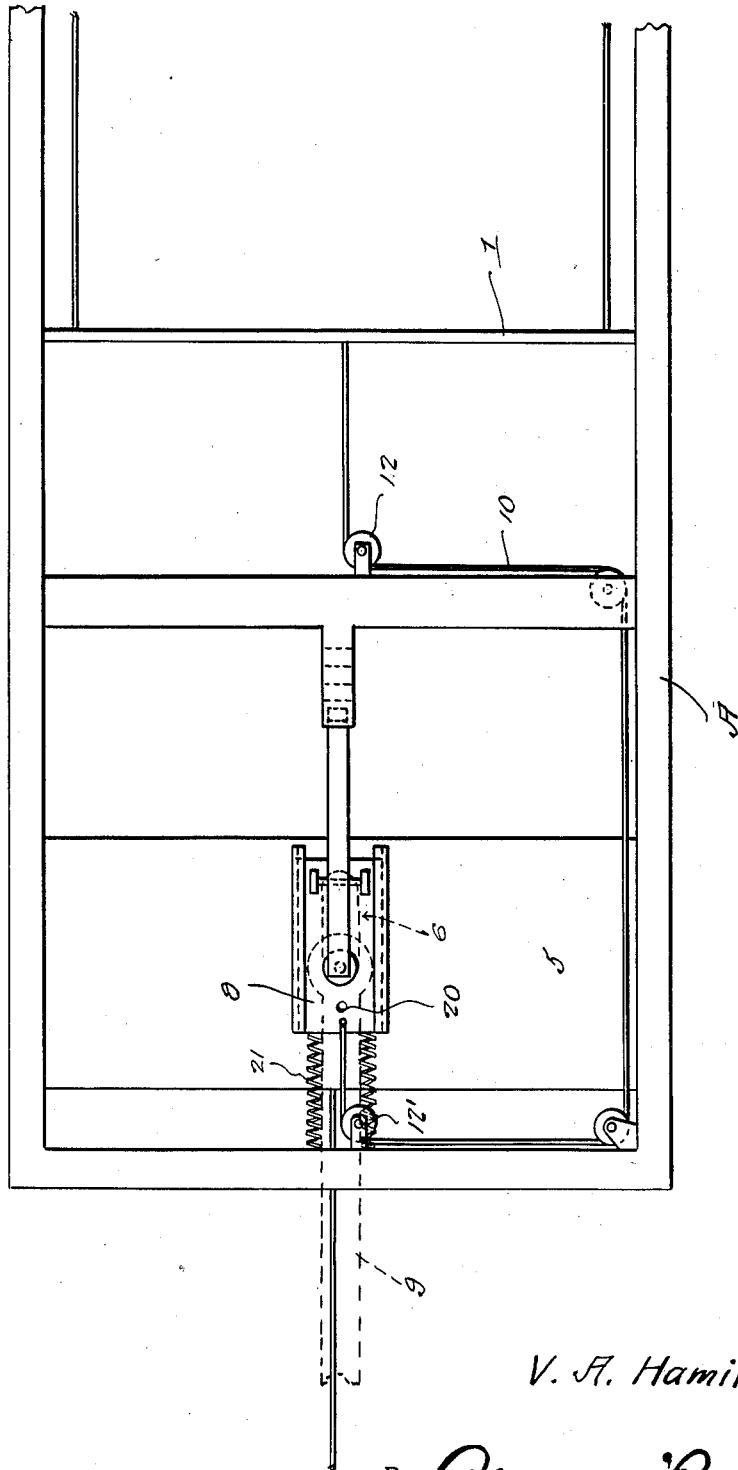

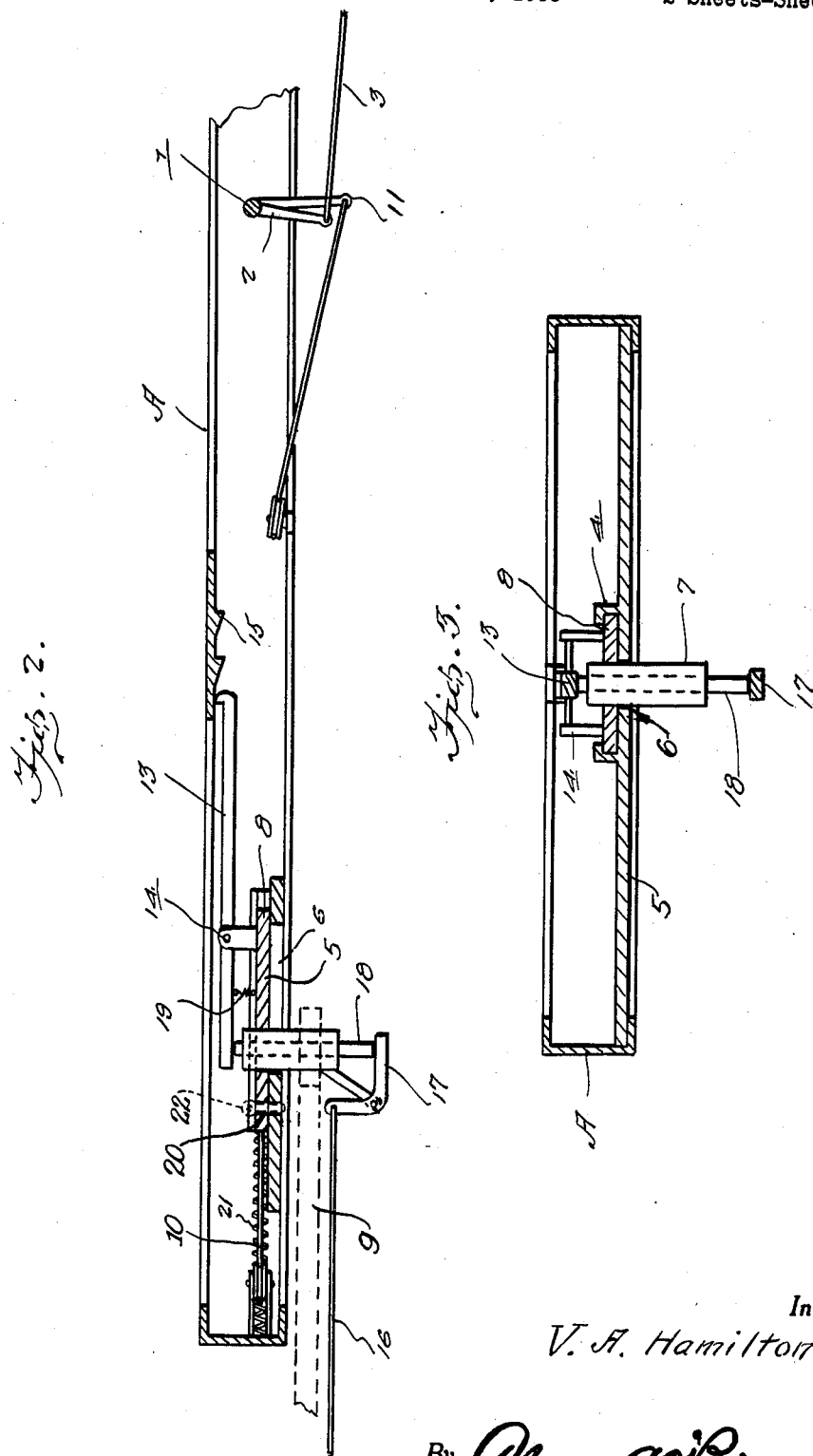

1,960,742

UNITED STATES PATENT OFFICE 1,960,742

BRAKE APPLYING DEVICE FOR TRAILERS

Van Alvin Hamilton, Palestine, Tex.

Application January 18, 1933, Serial No. 652,394

2 Claims. (Cl. 188—142)

This invention relates to a brake applying device for trailers, the general object of the invention being to provide means for applying the brakes of a trailer when the trailer moves toward the towing vehicle after said vehicle has slowed down.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views and in which:—

Figure 1 is a fragmentary plan view of a trailer showing the invention in use thereon.

Fig. 2 is a longitudinal sectional view through Fig. 1.

Fig. 3 is a transverse sectional view through Fig. 2.

In these views, the trailer frame is shown at A and the brake shaft at 1, said shaft having the depending arms 2 thereon to which the members 3 leading to the brakes are connected.

A longitudinally arranged guideway 4 is arranged on a bottom member 5 of the frame and said bottom member is provided with a longitudinally extending slot 6 through which the hollow king pin 7 passes. This king pin is carried by a slide 8 sliding in the guideways and the member 9 which connects the trailer to the towing vehicle is connected with the king pin as shown in dotted lines in Figs. 1 and 2. This member 9 may form part of the vehicle.

A cable 10 has one end connected to an arm 11 depending from the shaft 1 and said cable passes forwardly over the guiding pulleys 12 to the front pulley 12' from which it passes rearwardly and is connected with the forward end of the slide 8.

Thus it will be seen that when the towing vehicle is slowed down and the trailer moves forwardly under momentum, the king pin and slide 8 are held stationary as the frame of the trailer moves forwardly which results in a pull on the cable 10 which actuates the shaft 1 and thus the brakes of the trailer are applied.

In order to hold the brakes applied, I provide a lever 13 which is pivotally supported from the slide 8 as shown at 14 and has its hooked rear end adapted to engage the teeth 15 formed on a part of the trailer frame, so that as the frame moves forwardly, the hook end of the lever will slide over the teeth and thus the frame will be held against rearward movement until the lever 13 is moved to releasing position. This is done by means of a cable 16 leading to a point adjacent the driving seat of the towing vehicle and connected to a bell crank 17 which engages the lower end of a slidably mounted rod 18 which passes through the king pin and engages the forward end of the lever 13 as shown.

A spring 19 tends to hold the front end of the lever in engagement with the upper end of the pin 18 and the hooked end of the lever in engagement with a tooth 15.

Thus it will be seen that when the lever is in engagement with the teeth 15, a pull upon the cable 16 will raise the pin 18 and move the lever 13 to releasing position.

Whenever it is desired to prevent the automatic application of the brake, a pin 22 (shown in dotted lines in Figure 2) may be passed through a hole 20 in the slide 8 and into a hole in the part 5 to hold the slide against movement on the bottom part 5. Cushioning springs 21 connect the slide 8 with the front of the frame A.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. In combination with a trailer and its brake applying shaft, a member extending across the front part of the frame of the trailer and having a longitudinally extending slot therein and a pair of longitudinally extending guideways on said member, one on each side of the slot, a slide supported for sliding movement on the member between the guideways, a hollow pin carried by the slide and extending through the slot, a member connecting said pin with a part of the towing vehicle, a cable connecting the shaft with the slide, said cable having a portion extending from the front of the trailer to the slide, guiding pulleys for said cable and means for locking the slide to the trailer with the parts in a position with the brakes applied and means for releasing the locking means.

2. In combination with a trailer and its brake applying shaft, a supporting member extending across the front part of the frame of the trailer and having a longitudinally extending slot therein, longitudinally extending guideways on said supporting member between which the slot is arranged, a slide supported for sliding movement on the member between the guideways, a hollow pin carried by the slide and extending through the slot, means for connecting said pin to a part of a towing vehicle, a cable connecting the shaft with the slide and having a portion extending from the front of the trailer to the slide, guiding pulleys for said cable, a lever arranged above the slide and pivoted thereto, the rear end of said lever being of hook shape, depending ratchet teeth on a part of the frame of the trailer for engagement by said hook, a pin passing through the hollow pin and having its upper end engaging the front end of the lever, a bell crank supported from the slide, means for rocking said bell crank to raise the pin in the hollow pin to move the hooked end of the lever out of engagement with the ratchet means and means for holding the slide against movement when desired.

VAN ALVIN HAMILTON.